United States Patent
Lemoine (10) Patent No.: US 10,356,152 B2
(45) Date of Patent: Jul. 16, 2019

(54) REAL-TIME DISTRIBUTED INFORMATION PROCESSING SYSTEM

(71) Applicant: Orange, Paris (FR)

(72) Inventor: Benoît Lemoine, Ploubezre (FR)

(73) Assignee: Orange, Paris (FR)

( * ) Notice: Subject to any disclaimer, the term of this patent is extended or adjusted under 35 U.S.C. 154(b) by 64 days.

(21) Appl. No.: 15/321,615

(22) PCT Filed: Jun. 24, 2015

(86) PCT No.: PCT/FR2015/051695
§ 371 (c)(1),
(2) Date: Dec. 22, 2016

(87) PCT Pub. No.: WO2015/197977
PCT Pub. Date: Dec. 30, 2015

(65) Prior Publication Data
US 2017/0214731 A1    Jul. 27, 2017

(30) Foreign Application Priority Data

Jun. 26, 2014 (FR) ..................... 14 56013

(51) Int. Cl.
*H04L 29/06* (2006.01)
*H04W 4/70* (2018.01)
*H04L 29/08* (2006.01)

(52) U.S. Cl.
CPC .......... *H04L 65/80* (2013.01); *H04L 65/4076* (2013.01); *H04L 65/608* (2013.01);
(Continued)

(58) Field of Classification Search
CPC ... H04L 65/4076; H04L 65/608; H04L 65/80; H04L 67/10; H04L 45/02; H04L 45/04; H04L 45/10; H04W 4/70
(Continued)

(56) References Cited

U.S. PATENT DOCUMENTS 7,005,981 B1*  2/2006  Wade ................. G08B 13/2491
                                                340/539.16
2001/0037182 A1* 11/2001  Hall ......................... G01J 3/28
                                                702/104

(Continued)

FOREIGN PATENT DOCUMENTS

EP    2 487 863 A2    8/2012

OTHER PUBLICATIONS

Bourgault et al. 2004. Decentralized Bayesian Negotiation for Cooperative Search. *Proceedings of 2004 IEEE/RSJ International Conference on Intelligent Robots and Systems*, Sep. 28-Oct. 2, 2004, Sendai, Japan, pp. 2681-2686.

(Continued)

*Primary Examiner* — Robert J Lopata
(74) *Attorney, Agent, or Firm* — Knobbe, Martens, Olson & Bear, LLP (57) ABSTRACT

Some embodiments relate to a system for processing local information. The system provides feedback of certain information from a central processor to local processors, thus leaving the local processors to decide on the relevance of the individual contribution of same before transmitting the local information thereof. This allows the central processor to obtain all the information it needs in order to perform a real-time merge, while greatly reducing the number of messages transmitted by the local processors.

14 Claims, 5 Drawing Sheets

(52) U.S. Cl.
CPC ............... *H04L 67/12* (2013.01); *H04W 4/70* (2018.02); *H04L 67/10* (2013.01)

(58) Field of Classification Search
USPC .......................................................... 370/400
See application file for complete search history.

(56) References Cited

U.S. PATENT DOCUMENTS

| | | |
|---|---|---|
| 2008/0215609 A1 | 9/2008 | Cleveland et al. |
| 2009/0115654 A1* | 5/2009 | Lo ........................... F41G 7/008 342/62 |
| 2010/0228602 A1* | 9/2010 | Gilvar ................. G06Q 30/0252 705/14.5 |
| 2010/0310011 A1* | 12/2010 | Sexton .................. H03M 1/129 375/316 |
| 2012/0182160 A1* | 7/2012 | Hod ..................... G08G 1/0116 340/934 |
| 2012/0287245 A1* | 11/2012 | Holland ........... G08B 13/19602 348/46 |
| 2013/0063282 A1* | 3/2013 | Baldwin ............... B61L 29/282 340/941 |
| 2013/0201290 A1* | 8/2013 | Holland .................. H04N 7/181 348/46 |
| 2017/0017214 A1* | 1/2017 | O'Keeffe ............... G05B 15/02 |
| 2017/0243384 A1* | 8/2017 | Huang .................. G06T 3/0093 |
| 2017/0366747 A1* | 12/2017 | Wen ...................... H04N 5/2258 |

OTHER PUBLICATIONS

Van Kleek et al. 2006. OPF: A Distributed Context-Sensing Framework for Ubiquitous Computing Environments, In H. Y. Youn, M. Kim, and H. Morikawa (Eds.), *Ubiquitous Computing Systems Lecture Notes in Computer Science* (Chap. 3). Berlin: Springer.
International Search Report dated Oct. 7, 2015 for International Application No. PCT/FR2015/051695 filed Jun. 24, 2015, 7 pages.
Written Opinion Oct. 7, 2015 for International Application No. PCT/FR2015/051695 filed Jun. 24, 2015, 10 pages.
International Preliminary Report on Patentability dated Dec. 27, 2016 for Application No. PCT/FR2015/051695, filed Jun. 24, 2015.

* cited by examiner

REAL-TIME DISTRIBUTED INFORMATION PROCESSING SYSTEM

RELATED APPLICATIONS

This application is the U.S. National Phase of Application No. PCT/FR2015/051695 entitled "REAL-TIME DISTRIBUTED INFORMATION PROCESSING SYSTEM" filed Jun. 24, 2015, which designated the United States, and which claims the benefit of French Application No. 1456013 filed Jun. 26, 2014.

1. Field of the Invention

The invention is based in the fields of telecommunications and more particularly packet communication networks. In this type of network, it is possible to convey streams of data associated with real-time services.

The Internet protocol, called IP developed by the IETF, for "Internet Engineering Task Force", is implemented on packet communication networks both in order to support non-real-time services such as data transfer services, web page consultation services and electronic messaging services, and real-time or conversational services, such as IP telephony, IP video telephony or even IP video broadcasting.

One method for transporting data streams having real-time constraints is provided by the IETF in the RFC 3550 standard. Real-time data streams are generally composed of RTP, for "Real Time Protocol", packets, an RTP packet comprising digital data, originating from an analog-to-digital conversion of signals collected by sensors or from the digital processing of the result of the analog-to-digital conversion of the signals from these sensors. Thus, the RTP protocol is commonly used for the IP telephony service. In this case, the sensors are microphones directly connected to a digital processor used to locally carry out noise reduction and echo cancellation before the data are sent to the network. Real-time data can also correspond to digital data originating from signals collected by a set of distributed sensors observing the same phenomena as in the event of meteorological conditions or a three-dimensional dynamic scene being observed, for example.

It will be noted that the RTP packets can be encapsulated into UDP, for "User Datagram Protocol", defined by the IETF in the RFC 768 standard, packets, which are themselves encapsulated in the IP packets.

It will also be noted that a compression algorithm is habitually used to compress the digital data before they are inserted into the RTP packets. The video compression algorithms defined in the MPEG2 and MPEG4 standards defined by the Moving Picture Experts Group may be cited.

2. Prior Art

Fusion of information from distributed sensors consists in reconstituting a composite piece of information from information provided by each of the sensors. It is often associated with methods of calibrating sensors and pursuing singular elements among the composite information.

Distributed fusion is distinguished from centralized fusion mainly by the fact that the distributed sensors have local processors placed beside them that perform a computation on the basis of the measured values before data are sent to a central processor, which completes the fusion. Taken to the extreme, the distributed fusion principle can do without a central processor completely, each local processor completing the fusion.

Much work on distributed fusion algorithms has been undertaken, particularly in order to calibrate or select from a group of sensors those that send the most relevant information in order to obtain the best global fusion.

The article "Decentralized Bayesian Negotiation for Cooperative Search" (F. Bourgault, et al. Proceedings of 2004 IEEE/RSJ International Conference on Intelligent Robots and Systems, Sep. 28-Oct. 2, 2004, Sendai, Japan) can be cited, which describes a method for coordinating intelligent sensors transported by unmanned aircraft and interchanging information in point-to-point mode or in broadcast mode, in order to locate a target without resorting to a central body.

Generally, the methods require modeling in the form of a Kalman filter, which can be described as follows. A vector of intrinsic parameters $x(k)$, also called a state vector, develops over time in the following manner (k being the index for the instant of observation): $x(k)=F(k).x(k-1)+G(k).v(k)$. The state matrix $F(k)$ is assumed to be known, just like $G(k)$, the noise matrix relating to the model. The noise vector $v(k)$ relating to the vector of intrinsic parameters is assumed to have a known covariance $E\{v(i).v^T(j)\}=\delta_{ij}.Q(i)$. The intrinsic parameters of the model are related to the measurements taken by the sensors in consideration of an observation vector containing the periodically measured values $z(k)=H(k).x(k)+D(k).w(k)$. The observation matrix $H(k)$ is assumed to be known, as is $D(k)$, the noise matrix relating to the observation. The noise vector $w(k)$ relating to the observation is assumed to have a known covariance $E\{w(i).wT(j)\}=\delta_{ij}.R(i)$.

The existing solutions make no saving efforts in respect of the quantity and frequency of the necessary message interchanges, whether inside a plurality of local sensors for entirely distributed solutions or between the local sensors and a central processor, for solutions involving a central processor. This causes problems when the interchanges are based on radio communications, for example when communications are carried by Wi-Fi networks.

One of the aims of the invention is to overcome these disadvantages of the prior art.

3. Description of the Invention

The invention improves the situation using a method for locally processing information obtained by a first local processor connected to a central processor, the first local processor being identified by a first identifier and being capable of receiving messages from the central processor, the method comprising the following steps, implemented by the first local processor:

obtaining local measurements in order to form a local contribution vector, computing a first information matrix relating to the local contribution vector, receiving a message from the central processor, comprising a list of identifiers of local processors selected by the central processor on the basis of their relevance to the computation of a global prediction matrix, called the relevance list, on the basis of at least the presence of the first identifier in the relevance list, a step of determining a contribution authorization, on the basis of the determined contribution authorization, a step of transmitting a message comprising the first identifier of the first local processor, the first information matrix and the local contribution vector, at least to the central processor.

By virtue of the method for locally processing information according to the invention, a local processor allows itself to transmit a message only if its contribution is relevant, that is to say if its identifier features in a relevance list that is set up by a central processor. In this way, the communication channels between the central processor and the local processors are not cluttered with irrelevant messages.

According to one aspect of the invention, the message received from the central processor moreover comprises the global prediction matrix and the process moreover comprises the following steps:
  computing a value relating to the relevance of the input from the first information matrix to the global prediction matrix,
  comparing the computed value with a threshold;
and the contribution authorization is moreover determined on the basis of the result of the comparison.

The contribution of a local processor can become relevant, even if at a given instant it did not feature in the relevance list. Advantageously, if the local processor does not feature in the relevance list, it computes the relevance of its input and transmits a message only if this input is sufficient. Its contribution can therefore still be taken into account by the central processor, if it is deemed relevant by the local processor.

According to one aspect of the invention, the first local processor is also capable of receiving messages from at least one second local processor, and the method moreover comprises receiving a message from the second local processor, the message comprising a second information matrix relating to the second local processor, and the computation of a value relating to the relevance of the input from the first information matrix moreover taking account of the input from the second information matrix to the global prediction matrix.

It is possible that other local processors contribute. In this case, their input can have an influence on the relevance of the input from the first local processor. Advantageously, if the first local processor is not in the relevance list, its contribution can still be taken into account by the central processor, but only if it remains relevant when it is taken into account in combination with the contributions of other local processors.

According to one aspect of the invention, the message from the second local processor moreover comprises a second identifier, the method moreover comprising unsubscribing from a message stream from the second local processor if the second identifier is not included in the relevance list.

If another local processor does not feature in the relevance list, it may be unnecessary for the first processor to take into account its contribution when it determines the relevance of its own contribution in combination with that of other local processors. Advantageously, it has the possibility of stopping receiving the messages from another local processor, as long as this other local processor does not reappear in the relevance list, which limits the clutter on the communication channels.

According to one aspect of the invention, the method for locally processing information moreover comprises subscribing to a message stream from at least one second local processor for which an identifier is included in the relevance list.

In order to limit clutter on the communication channels, it is not desirable for a local processor to systematically receive the messages from all the other local processors. However, it is not desirable for a local processor not to receive any message from another local processor whose contribution is relevant. Advantageously, a local processor has the possibility of subscribing only to streams from the local processors that are present in the relevance list, which limits the clutter on the transmission channels. Furthermore, if the relevance list is organized by degree of relevance, then said local processor can choose to subscribe only to the first one(s) but not to all, which limits the clutter on the communication channels even more.

The various aspects of the method for locally processing information that have just been described can be implemented independently of one another or in combination with one another.

The invention also concerns a method for centrally processing local information obtained by local processors of a plurality of local processors connected to a central processor, comprising the following steps implemented by the central processor:
  receiving a message from a first local processor, the message comprising an identifier, an information matrix and a contribution vector, which relate to the first local processor,
  receiving a message from a second local processor, the message comprising an identifier, an information matrix and a contribution vector, which relate to the second local processor,
  adding the identifiers that relate to the first and second local processors in a list of local processors that are listened to by the central processor,
  computing a global prediction matrix from the received information matrices,
  selecting at least one local processor from the list of local processors that are listened to by the central processor, on the basis of a relevance criterion for the information matrix associated with the at least one local processor,
  transmitting to the plurality of local processors a message comprising the global prediction matrix and a list of the identifiers of the selected local processors, called a relevance list.

By virtue of the method for centrally processing local information according to the invention, all the local processors obtain, from the central processor, a return that is representative of those of the contributions transmitted by local processors that are taken into account by the central processor.

The list of selected local processors and the global prediction matrix which are generated by the central processor and transmitted to all the local processors, allow each of the latter to determine exactly the relevance of the input from their own contribution before transmitting a message, and therefore to authorize or effectively inhibit the transmission of messages. This contributes to limiting the clutter on the communication channels to relevant messages.

According to one aspect of the invention, the selection step comprises the following steps:
  computing a value relating to the relevance of the input from the information matrix of the local processor to the global prediction matrix,
  comparing the computed value with a threshold, the selection being made if the threshold is reached.

By virtue of this aspect, the central processor can ignore, and therefore have the other local processors ignore, those of the local processors whose input is least relevant.

According to one aspect of the invention, when multiple local processors are selected, the method comprises, before the transmission step, sorting by order of decreasing relevance the identifiers of local processors selected in the relevance list.

By virtue of this aspect, a local processor receiving the relevance list can determine without computation which of the selected processors in the list is the most relevant. It can thus decide, without computation, to take into account only the most relevant one or the "n" most relevant ones.

The various aspects of the method for centrally processing local information that have just been described can be implemented independently of one another or in combination with one another.

According to one aspect of the method for locally processing information and of the method for centrally processing local information, the messages are packets of RTP type, and the relevance list is included in the header of a packet of RTP type.

The vectors and the matrices computed by the processors need to be interchanged at high frequencies so that the central processor is able to ensure fusion of the local information that reflects reality the closest. The RTP packets have the advantage of being provided in order to transport digital data in real time, and can also transport signaling information, such as the relevance list, in their header.

The invention also concerns a device for locally processing information obtained by a first local processor connected to a central processor, the first local processor being identified by a first identifier and being capable of receiving messages from the central processor, the device comprising:
- a module for obtaining local measurements in order to form a local contribution vector,
- a module for computing a first information matrix relating to the local contribution vector,
- a module for receiving a message from the central processor, comprising a list of identifiers of local processors selected by the central processor on the basis of their relevance to the computation of a global prediction matrix called a relevance list,
- a module for determining a presence of the first identifier in the relevance list,
- a module for determining a contribution authorization, on the basis of at least the presence of the first identifier in the relevance list,
- a module for transmitting a message comprising the first identifier of the first local processor, the first information matrix and the local contribution vector at least to the central processor, on the basis of the determined contribution authorization.

This device, which is capable of implementing, in all of its embodiments, the method for locally processing information that has just been described, is intended to be included in a local processor.

The invention also concerns a device for centrally processing local information obtained by local processors of a plurality of local processors connected to a central processor, comprising:
- a module for receiving a message from a local processor, the message comprising an identifier, an information matrix and a contribution vector, which relate to the local processor,
- a module for adding the identifier relating to the local processor to a list of local processors that are listened to by the central processor,
- a module for computing a global prediction matrix from the received information matrix,
- a module for selecting at least one local processor from the list of local processors that are listened to by the central processor, on the basis of a relevance criterion for the information matrix associated with the at least one local processor,
- a module for transmitting to the plurality of local processors a message comprising the global prediction matrix and a list of the identifiers of the selected local processors, called a relevance list.

This device, which is capable of implementing, in all its embodiments, the method for centrally processing local information that has just been described, is intended to be included in a central processor.

The invention also concerns a system for processing local information comprising a device for centrally processing local information as has just been described and at least one device for locally processing information as has just been described.

Such a system, by distributing to the local processors some of the computations linked to the relevance of their individual contribution, allows a central processor to obtain all the information that it needs in order to perform real-time fusion thereof, while greatly reducing the number of messages transmitted by the local processors, and therefore the clutter that they create in the communication channels.

The invention also concerns a computer program comprising instructions for implementing the steps of the method for locally processing information that has just been described when this program is executed by a processor.

The invention also concerns a recording medium readable by a local processor on which is recorded the program that has just been described, which can use any programming language, and be in the form of source code, object code, or intermediate code between source code and object code, such as in a partially compiled form, or in any other desirable form.

The invention also concerns a computer program comprising instructions for implementing the steps of the method for centrally processing local information that has just been described when this program is executed by a processor.

Finally, the invention concerns a recording medium readable by a central processor on which is recorded the program that has just been described, which can use any programming language, and be in the form of source code, object code, or intermediate code between source code and object code, such as in a partially compiled form, or in any other desirable form.

4. DESCRIPTION OF THE FIGURES

Other advantages and features of the invention will emerge more clearly on reading the description below of a particular embodiment of the invention, which is provided by way of simple illustrative and nonlimiting example, and the appended drawings, among which.

5. DETAILED DESCRIPTION OF AT LEAST ONE EMBODIMENT OF THE INVENTION

The remainder of the description is used to present examples of multiple embodiments of the invention based on Wi-Fi as communication technology, but the invention also applies to other communication technologies, such as cellular networks (defined in the 3GPP), Ethernet networks (defined in the IEEE), etc.

Figure 1:
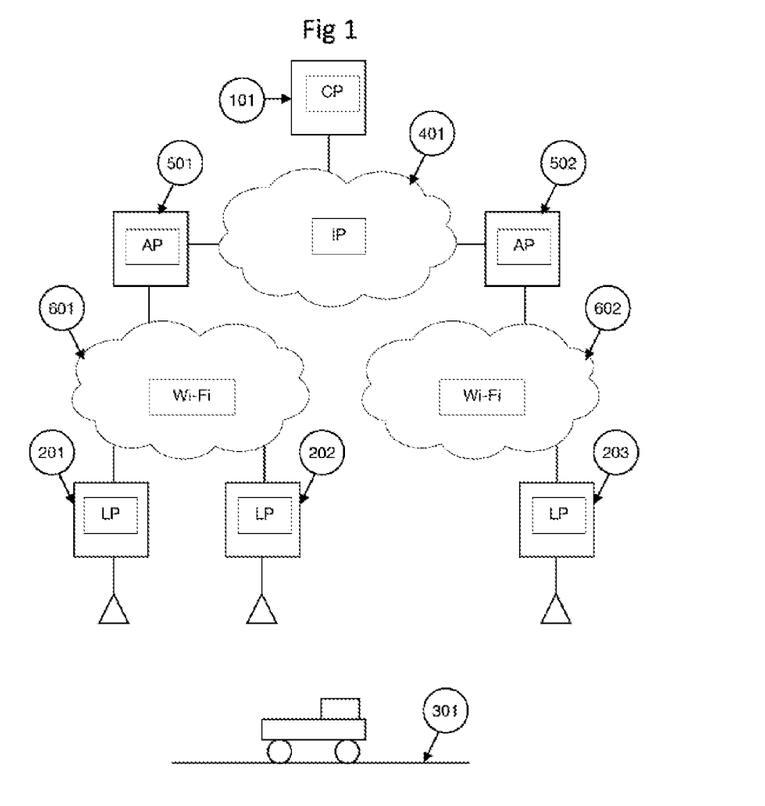
FIG. 1 schematically presents an exemplary network implementing the invention, comprising a central processor and a plurality of local processors.

FIG. 1 schematically presents an exemplary network implementing the invention, comprising a central processor and a plurality of local processors.

In this example, local processors 201, 202 and 203 interchange information with a central processor 101 via an IP network 401 in real time.

The situation considered here is the particular, illustrative but nonlimiting case, in which the local processors belong to video cameras and in which the real-time interchange of information is effected with the aim of generating a three-dimensional view of a common scene 301 on the basis of a meshed 3D model or else on the basis of an integral image composed of multiple views that are rotationally out of step along a vertical axis and allowing autostereoscopic rendering.

As Wi-Fi technology is available on many consumer appliances, we will take it as an example of communication technology, but other technologies can be considered, such as cellular radio (for example 4G defined in the 3GPP under the name LTE). Video cameras may thus be, by way of example, digital cameras having a Wi-Fi interface, Wi-Fi tablets or smartphones having an integrated miniature camera and a Wi-Fi interface. As video cameras also have integrated or external microphones, the concept described below can easily be extended to generation of a spatialized sound recording.

In this kind of application, the IP protocol can be used to transport information between the local processors 201, 202, 203 and the central processor 101.

RFC3550 provides for the encapsulation of RTP packets either in unicast IP packets, defined for IPv4, for example, in RFC 791 as having a unicast destination IP address, or in multicast IP packets, defined for IPv4, for example, in RFC 3171 as having a multicast destination IP address belonging to the address range 224.0.0.0 to 239.255.255.255. The RTP packets can also be encapsulated in unicast or multicast IPv6 packets, the specification for which can be found in RFC 2460.

Unlike a broadcast mode, multicast mode allows the broadcast of the information sent to be limited and ensures that only the members of a multicast group are able to receive the information sent to this multicast group.

Thus, the multicast IP packets are conveyed in the IP network and replicated as closely as possible to IGMP (referring to the English terminology: "Internet Group Management Protocol", version 2 of which is defined in RFC 2236, for example) clients that have asked the IP network to receive the IPv4 packets transmitted to a given multicast IPv4 address, or MLD (referring to the English terminology: "Multicast Listener Discovery", defined in RFC 2710, for example) clients that have asked the IP network to receive the IPv6 packets transmitted to a given multicast IPv6 address.

Multicast mode therefore has the advantage over broadcast mode of allowing transport of the information and return of the information between sensors and central processor on an IP network that is already used for other services and that transports IP packets between other terminal equipment.

This advantage particularly allows the central processor CP to be positioned a long way from the access networks to which the local processors LP are connected and thus allows a smaller number of central processors to be implemented in order to provide an information fusion service for the general public at a lower cost, or even to limit the number of said central processors to one, as in our example.

The local processors can thus use unicast or multicast to send information to the central processor, using RTP packets in which they will reveal their SSRC (referring to the English terminology: "Synchronisation SouRCe") identifier, and the central processor can use unicast or multicast to send information to the local processors, using RTP packets in which it will reveal its SSRC identifier.

In order to limit the number of multicast streams received by a multicast client, the latter can ask the network to receive multicast streams by specifying, in addition to the IP address of the multicast group, the source IP address(es) to be authorized or to be excluded using the IGMPv3 (Internet Group Management Protocol), for example, which is defined in the IETF standard RFC 3376, or the MLDv2 (Multicast Listener Discovery) protocol, which is defined in the IETF standard RFC 3810.

When a multicast client subscribes to a multicast stream transmitted by another client or by a server, this means that the IP address of this other client or of the server is specified in a multicast stream reception request. When a multicast client unsubscribes from a multicast stream transmitted by another client or by a server, this means that the IP address of this other client or of the server is no longer specified in a multicast stream reception request, or that it is specified in a multicast stream reception cancellation.

We will subsequently assume that the central processor and the local processors send their RTP packets by multicast. In order to receive the RTP packets transmitted by the local processors, the central processor subscribes to the whole multicast group without specifying the IP addresses of the multicast stream sources. So as to receive only the RTP packets from the central processor by default, the local processors subscribe to the multicast group by specifying the IP address of the central processor. Finally, we will assume that the local processors also know the IP addresses of the other local processors so as to be able to specify, in an update to its subscription, the IP address of another local processor from which it wishes to receive or no longer receive RTP traffic.

The Wi-Fi networks 601 and 602, supported by the access points AP 501 and 502, respectively, have the advantage of also supporting multicast mode, so that when a Wi-Fi terminal sends a Wi-Fi frame by multicast, any other Wi-Fi terminal within its range can receive the Wi-Fi frame and take it into account. Access to the Wi-Fi medium can be managed by mechanisms using an access-controlled channel HCCA (HCF Controlled Channel Access), which is defined in the 802.11e standard and managed by an HCF (Hybrid Coordination Function). In the case of multicast traffic, it is possible to use an IGMP or MLD proxy in order to ensure control of subscription to the multicast streams on the basis of the load observed by the Wi-Fi access point, which allows only the collision avoidance multiple access channel to be used in accordance with the CSMA/CA (Carrier Sense Multiple Access with Collision Avoidance) method defined within the framework of the DCF (Distributed Coordination Function), the only obligatory function of the IEEE 802.11 standard, making it compatible with the majority of Wi-Fi terminals.

The method for contributing information according to the invention, implemented by a local processor, can be divided into three phases:
a phase PHL1 of obtaining locally measured information,
a phase PHL2 of listening to other local processors,
a phase PHL3 of listening to the central processor.

Figure 2:
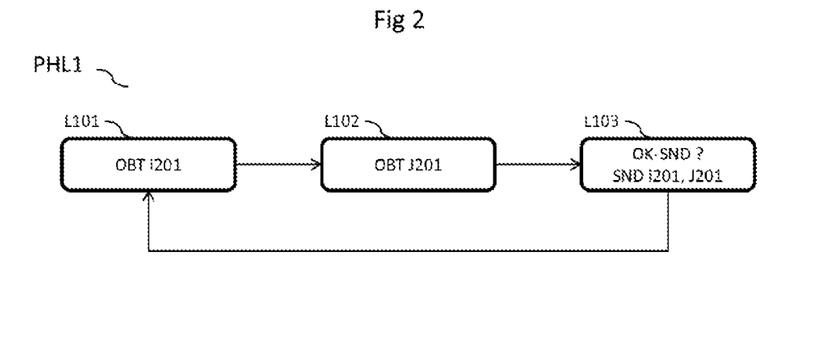
FIG. 2 presents an exemplary implementation of a first aspect of the method for locally processing information, according to a particular embodiment of the invention.

FIG. 2 presents an exemplary implementation of a first aspect of the method for contributing information, according to a particular embodiment of the invention. This first aspect of the contribution method concerns the phase PHL1, which comprises steps L101 to L103.

In a step L101, the local processor 201 obtains, for example from a sensor to which it is connected, one or more local measurements $z(k)$ and forms a local contribution vector i201 equal to $H^T(k).R^{-1}(k).z(k)$ with the H and R matrices of the Kalman filter. This vector i201 is of a size corresponding to the total number of intrinsic parameters that the system is capable of processing for fusion, but the local measurements obtained by the local processor 201 are able to concern only a subset of these intrinsic parameters.

In a step L102, the local processor 201 computes an information matrix J201 relating to the vector i201 and equal to $H^T(k).R^{-1}(k).H(k)$ with the H and R matrices of the Kalman filter.

In a step L103 that is executed if the local processor 201 has an authorization to contribute, the determination of which is described subsequently, it transmits a message comprising its identifier SSRC1, the computed matrix J201 and the obtained vector i201. This message is transmitted in multicast mode to the central processor 101, and to the other local processors that have subscribed to the streams of the local processor 201.

Steps L101 to L103 forming the phase PHL1 are repeated at a rate suited to the dynamicity of the local measurements obtained by the local processor.

If the local processor 201 does not have said authorization to transmit, step L103 is not performed, which limits the number of messages transmitted by the local processor.

Figure 3:
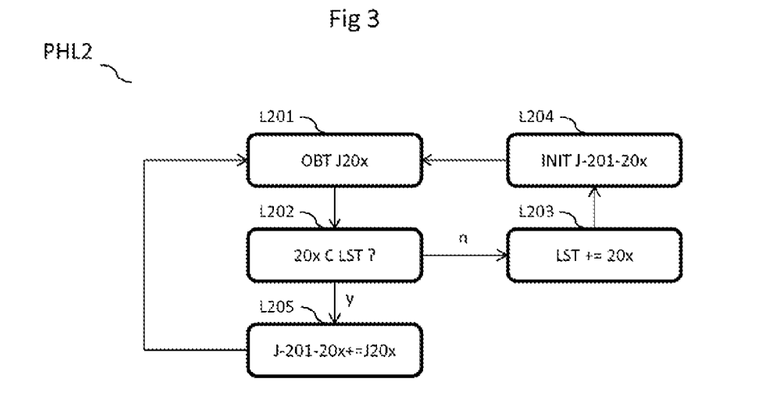
FIG. 3 presents an exemplary implementation of a second aspect of the method for locally processing information, according to a particular embodiment of the invention.

FIG. 3 presents an exemplary implementation of a second aspect of the method for contributing information, according to a particular embodiment of the invention. This second aspect of the contribution method concerns the phase PHL2, which comprises steps L201 to L205.

In a step L201, the local processor 201 receives a message from another local processor, for example the local processor 202. The message comprises an identifier SSRC2 of the local processor 202, and an information matrix J202 computed by the local processor 202.

In a step L202, the local processor 201 checks whether the identifier SSRC2 is in a list SSRC-201 of local processors listened to by the local processor 201.

If the list SSRC-201 does not include the identifier SSRC2, then the local processor 201 adds it to said list in a step L203, and, in a step L204, initializes a matrix J-201-202, called incremented information matrix, with the values of the received information matrix J202.

If the list SSRC-201 already includes the identifier SSRC2, then the local processor 201 adds the values of the received information matrix J202 to the incremented information matrix J-201-202 in a step L205.

Within a given period corresponding to the duration of a phase PHL3 that is described later on, steps L201 to L205 forming the phase PHL2 are repeated as many times as the local processor 201 receives a message from another local processor. It will therefore be understood that the local processor 201 locally constructs a set of incremented information matrices J-201-20x, from the messages received from other local processors 20x, and that the local processor can receive either zero or one or more messages from one and the same other local processor during this period.

Figure 4:
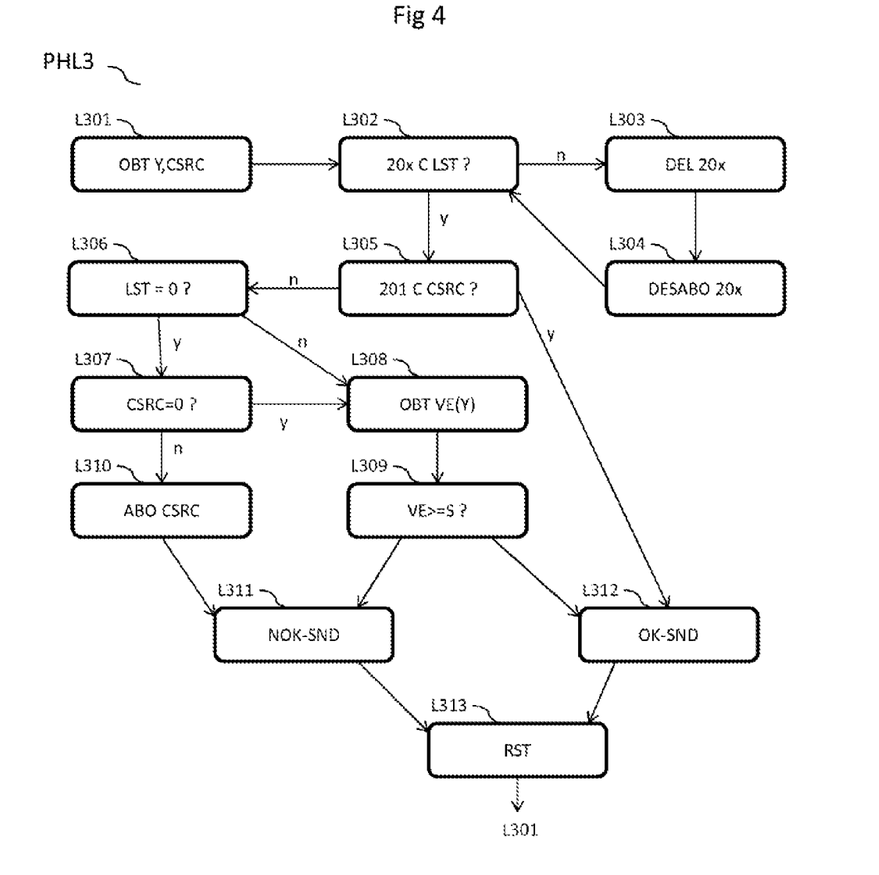
FIG. 4 presents an exemplary implementation of a third aspect of the method for locally processing information, according to a particular embodiment of the invention.

FIG. 4 presents an exemplary implementation of a third aspect of the method for contributing information, according to a particular embodiment of the invention. This third aspect of the contribution method concerns the phase PHL3, which comprises steps L301 to L313.

In a step L301, the local processor 201 receives a message from the central processor 101, comprising a global prediction matrix Y, and a list CSRC of identifiers of local processors selected by the central processor 101.

In a step L302, the local processor 201 checks that its list SSRC-201 is strictly included in the list CSRC.

If the list SSRC-201 contains identifiers of local processors that are not present in the list CSRC, then the local processor 201 removes these identifiers from its list SSRC-201 in a step L303, and unsubscribes from these local processors, in a step L304. Thus, in the next phase PHL2, the local processor 201 will no longer receive messages from these local processors that have not been selected by the central processor 101, and the clutter on the network will be decreased thereby.

In a step L305, the local processor 201 checks that its own identifier SSRC1 is included in the list CSRC.

If the identifier SSRC1 is included in the list CSRC, then the authorization to contribute is given or maintained, in a step L312. This authorization is used in step L103 described above.

If the identifier SSRC1 is not included in the list CSRC, then the local processor 201 determines whether its contribution is relevant, in steps L306 to L309.

In a step L306, the local processor 201 checks whether its list SSRC-201 of local processors that are listened to is empty.

In a step L307, the local processor 201 then checks whether the list CSRC of local processors selected by the central processor 101 is empty.

If the list SSRC-201 is empty, and if the list CSRC is not empty, then the local processor 201 subscribes to at least one local processor from the list CSRC, in a step L310. Advantageously, the local processor subscribes to the first, or to n first, local processor(s) from the list in an order of decreasing relevance. In this case, the contribution of the local processor 201 is not deemed relevant, and the authorization to contribute is stopped or withdrawn, in a step L311.

If the list SSRC-201 is not empty, or if the list CSRC is empty, then the local processor computes, in a step L308, a value VE relating to the relevance to the global prediction matrix Y of the input from its information matrix J201 and from the incremented information matrices J-201-20x corresponding to local processors 20x whose identifiers have not been removed from the list SSRC-201 in step L303.

If |M| is used to denote the determinant of the matrix M, then the value VE is computed as being the ratio between the determinant of the matrix Y augmented by the matrix J201 and the matrices J-201-20x, and the determinant of the matrix augmented solely by the matrices J-201-20x: VE=|Y+J201+ΣJ-201-20x|/|Y+ΣJ-201-20x|.

In a step L309 following step L308, the local processor compares the value VE with a threshold S. If the value VE reaches or exceeds S, then step L312 is performed, in which the authorization to contribute is given or maintained. Otherwise, step L311 is performed, in which the authorization to contribute is stopped or withdrawn.

In a step L313 at the end of the phase PHL3, and before the start of a new cycle of phases PHL2, the local processor 201 zeroes all its incremented information matrices J-201-20x.

The method for centrally processing local information according to the invention, implemented by the central processor, can be divided into three phases:
- a phase PHC1 of listening to the local processors,
- a phase PHC2 of fusing information measured by the local processors,
- a phase PHC3 of transmitting a global prediction matrix and a list of selected local processors.

Figure 5:
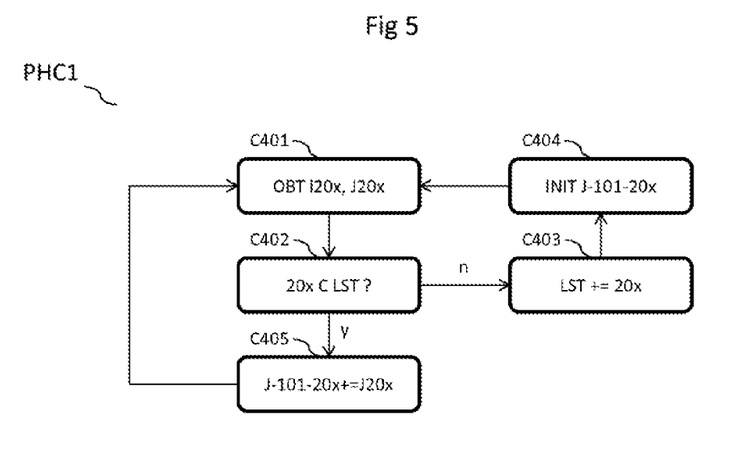
FIG. 5 presents an exemplary implementation of a first aspect of the method for centrally processing local information, according to a particular embodiment of the invention.

FIG. 5 presents an exemplary implementation of a first aspect of the method for centrally processing local information, according to a particular embodiment of the invention. This first aspect of the method for centrally processing local information concerns the phase PHC1, which comprises steps C401 to C405.

In a step C401, the central processor 101 receives a message from a local processor, for example the local processor 201. The message comprises the identifier SSRC1 of the local processor 201, along with the local contribution vector i201 formed by the local processor 201, and the information matrix J201 computed by the local processor 201.

In a step C402, the central processor 101 checks whether the identifier SSRC1 is in a list SSRC-101 of local processors listened to by the central processor 101.

If the list SSRC-101 does not include the identifier SSRC1, then the central processor 101 adds it to said list in a step C403, and, in a step C404, initializes an incremented information matrix J-101-201, with the values of the received information matrix J201.

If the list SSRC-101 already includes the identifier SSRC1, then the central processor 101 adds the values of the received information matrix J201 to the incremented information matrix J-101-201, in a step C405.

Within a given period corresponding to the duration of a phase PHC3 described later on, steps C401 to C405 forming the phase PHC1 are repeated as many times as the central processor 101 receives a message from a local processor. It will therefore be understood that the central processor 101 centrally constructs a set of incremented information matrices J-101-20x, from the messages received from local processors 20x, and that the central processor 101 can receive either zero or one or more messages from one and the same local processor during this period.

Figure 6:
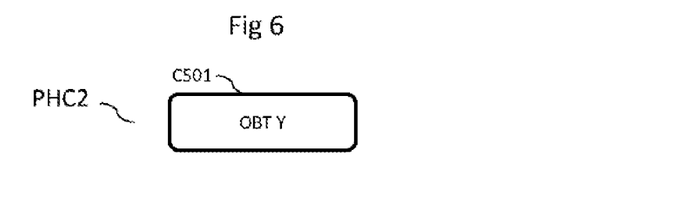
FIG. 6 presents an exemplary implementation of a second aspect of the method for centrally processing local information, according to a particular embodiment of the invention.

FIG. 6 presents an exemplary implementation of a second aspect of the method for centrally processing local information, according to a particular embodiment of the invention. This second aspect of the method for centrally processing local information concerns the phase PHC2, which comprises step C501.

In a step C501, the central processor 101 computes a fusion of the local information as measured by the local processors, from the contribution vector i20x and the information matrices J20x received from the local processors 20x.

This phase PHC2, strictly speaking called a fusion phase, is repeated in accordance with a periodicity suited to the type of information that is fused. Looking back at the example of FIG. 1, that is to say the three-dimensional scene 301 observed by the video cameras 201, 202 and 203, the periodicity of the fusion phase must be of a rate proportional to the speed of the moving objects that make up the scene 301, in order to obtain a resolution for the fusion that is satisfactory.

x is used to denote a global information vector and X is used to denote a global information matrix, which are filled with zero values before the first occurrence of the phase PHC2.

y is used to denote a global prediction vector and Y is used to denote a global prediction matrix, which are filled with zero values before the first occurrence of the phase PHC2.

On each iteration of the phase PHC2, the matrices F, G and Q of the Kalman filter are taken into account in order to accomplish the following actions:
- A matrix P is computed from the last global information matrix X (computed for the preceding iteration of the phase PHC2) as being equal to $P=F^{-T}.X.F^{-1}$.
- A matrix E is computed from the matrix P as being equal to $E=G^T.P.G+Q^{-1}$.
- A matrix O is computed from the matrices P and E as being equal to $O=P.G.E^{-1}$.
- The global prediction vector y is computed from the last global information vector x (computed for the preceding iteration of the phase PHC2) as being equal to $y=(1-O.G^T).F^{-T}.x$.
- The global prediction matrix Y is computed as being equal to $Y=P-O.E.O^T$.
- The information vector x is computed from the global prediction vector y augmented by the contribution vectors i20x received from the local processors 20x: x=y+Σi20x.
- The information matrix X is computed from the global prediction matrix Y augmented by the information matrices J20x received from the local processors 20x: X=Y+ΣJ20x.

It will be understood that the computation of the global prediction matrix Y is a product of the phase PHC2.

Figure 7:
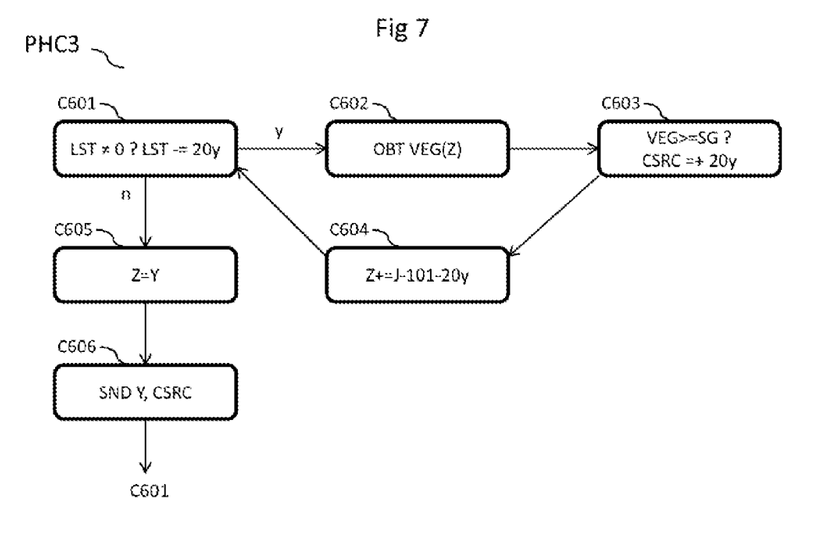
FIG. 7 presents an exemplary implementation of a third aspect of the method for centrally processing local information, according to a particular embodiment of the invention.

FIG. 7 presents an exemplary implementation of a third aspect of the method for centrally processing local information, according to a particular embodiment of the invention. This third aspect of the method for centrally processing local information concerns the phase PHC3, which comprises steps C601 to C606.

Z is used to denote an incremental information matrix filled with zero values before the first occurrence of the phase PHC3.

The list CSRC of local processors selected by the central processor is initially empty at the start of each occurrence of the phase PHC3.

In a step C601, if the list SSRC-101 is not empty, then the central processor 101 identifies in this list the local processor 20y whose determinant of the incremented information matrix J-101-20y is highest. The central processor 101 removes the corresponding identifier SSRCy from the list SSRC-101.

In a step C602, the central processor 101 computes a value VEG relating to the relevance of the input from the incremented information matrix J-101-20y to the incremental information matrix Z.

If |M| is used to denote the determinant of the matrix M, then the value VEG is computed as being the ratio between the determinant of the matrix Z augmented by the matrix J-101-20y and the determinant of the matrix Z: VEG=|Z+J-101-20y|/|Z|.

If the value VEG reaches a predetermined threshold SG, then the identifier SSRCy is added to the list CSRC of local processors selected by the central processor, in a step C603. Advantageously, the order of addition is observed, which allows a list CSRC organized by decreasing relevance of local processors to be obtained.

In a step C604, the central processor 101 adds the values of the incremented information matrix J-101-20y to the incremental information matrix Z: Z=Z+J-101-20y.

Steps C601 to C604 are repeated until the list SSRC-101 is empty.

Once the list SSRC-101 is empty, the central processor 101 replaces, in a step C605, the content of the incremental information matrix Z with the content of the global prediction matrix Y computed for the last occurrence of the phase PHC2.

In a step C606, the central processor 101 transmits to the plurality of local processors the incremental information matrix Z, which is also, at this stage, the global prediction matrix Y computed during the last occurrence of the phase PHC2, along with the list CSRC of selected local processors.

Figure 8:
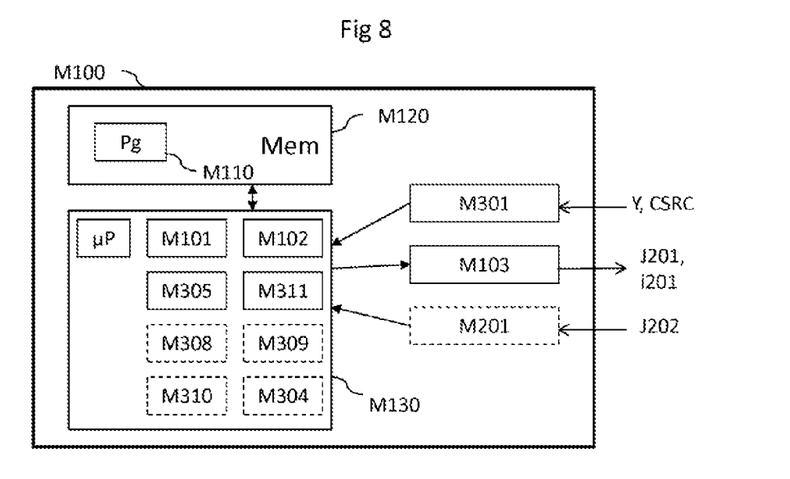
FIG. 8 presents an exemplary structure of a device for locally processing information, according to an aspect of the invention.

In connection with FIG. 8, an exemplary structure of a device for locally processing information, according to an aspect of the invention, is now presented.

The device M100 for transmitting routing information implements the method for locally processing information.

Such a device M100 may be included in a first local processor.

By way of example, the device M100 comprises a processing unit M130, for example equipped with a microprocessor μP, and controlled by a computer program M110, stored in a memory M120 and implementing the method for locally processing information according to the invention. On initialization, the code instructions of the computer program M110 are loaded into a RAM memory, for example, before being executed by the processor of the processing unit M130.

Such a device M100 comprises:
a module M101 for obtaining local measurements in order to form a local contribution vector,
a module M102 for computing a first information matrix relating to the local contribution vector,
a module M301 for receiving a message from the central processor, comprising a list of identifiers of local processors selected by the central processor on the basis of their relevance to the computation of a global prediction matrix called a relevance list, along with a global prediction matrix,
a module M305 for determining a presence of the first identifier in the relevance list,
a module M311 for determining a contribution authorization, on the basis of at least the presence of the first identifier in the relevance list,
a module M103 for transmitting a message comprising the first identifier of the first local processor, the first information matrix and the local contribution vector at least to the central processor, on the basis of the determined contribution authorization.

Advantageously, the device M100 may also comprise:
a module M308 for computing a value relating to the relevance of the input from at least the first information matrix to the global prediction matrix,
a comparison module M309 for comparing the computed value with a threshold,
a module M310 for subscribing to a message stream from at least one second local processor for which an identifier is included in the relevance list,
a module M201 for receiving a message from the second local processor, the message comprising a second information matrix relating to the second local processor,
a module M304 for unsubscribing from a message stream from the second local processor if its identifier is not included in the relevance list.

Figure 9:
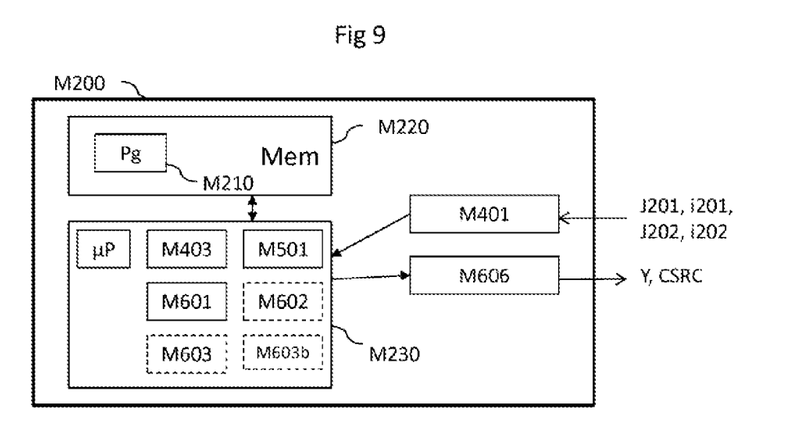
FIG. 9 presents an exemplary structure of a device for centrally processing local information, according to an aspect of the invention.

In connection with FIG. 9, an exemplary structure of a device for centrally processing local information, according to an aspect of the invention, is now presented.

The device M200 for transmitting routing information implements the method for centrally processing local information.

Such a device M200 may be included in a central processor.

By way of example, the device M200 comprises a processing unit M230, for example equipped with a microprocessor μP, and controlled by a computer program M210, stored in a memory M220 and implementing the method for centrally processing local information according to the invention. On initialization, the code instructions of the computer program M210 are loaded into a RAM memory, for example, before being executed by the processor of the processing unit M230.

Such a device M200 comprises:
a module M401 for receiving a message from a local processor, the message comprising an identifier, an information matrix and a contribution vector, which relate to the local processor,
a module M403 for adding the identifier relating to the local processor to a list of local processors that are listened to by the central processor,
a module M501 for computing a global prediction matrix from the received information matrix,
a module M601 for selecting at least one local processor from the list of local processors that are listened to by the central processor, on the basis of a relevance criterion for the information matrix associated with the at least one local processor,
a module M606 for transmitting to the plurality of local processors a message comprising the global prediction matrix and a list of the identifiers of the selected local processors, called a relevance list.

Advantageously, the device M200 may also comprise:
a module M602 for computing a value relating to the relevance of the input from the information matrix of a local processor to the global prediction matrix,
a module M603 for comparing the computed value with a threshold,
a module M603b for sorting, by order of decreasing relevance, the identifiers of local processors selected in the relevance list.

Advantageously, the transmission modules of the devices M100 and M200 are capable of transmitting RTP packets.

Advantageously, the reception modules of the devices M100 and M200 are capable of receiving RTP packets.

The modules described with reference to FIGS. 8 and 9 may be hardware or software modules.

The invention claimed is:

1. A method of locally processing information obtained by a first local processor connected to a central processor, the first local processor being identified by a first identifier and being configured to receive messages from the central processor, the method being implemented by the first local processor and comprising:
- obtaining local measurements in order to form a local contribution vector;
- computing a first information matrix relating to the local contribution vector;
- receiving a message from the central processor, including a relevance list of identifiers of local processors selected by the central processor on the basis of their relevance to the computation of a global prediction matrix;
- on the basis of at least the presence of the first identifier in the relevance list, determining a contribution authorization; and
- on the basis of the determined contribution authorization, transmitting a message comprising the first identifier of the first local processor, the first information matrix and the local contribution vector, at least to the central processor.

2. The method of locally processing information as claimed in claim 1, wherein the message received from the central processor further includes the global prediction matrix and wherein the method further comprises:
- computing a value relating to the relevance of the input from the first information matrix to the global prediction matrix; and
- comparing the computed value with a threshold;
wherein the contribution authorization is further determined on the basis of the result of the comparison.

3. The method of locally processing information as claimed in claim 2, wherein the first local processor is also capable of receiving messages from at least one second local processor, wherein the method further comprises:
- receiving a message from the second local processor, the message including a second information matrix relating to the second local processor;
wherein the computation of a value relating to the relevance of the input from the first information matrix further takes account of the input from the second information matrix to the global prediction matrix.

4. The method of locally processing information according to claim 3, wherein the message from the second local processor further includes a second identifier, and wherein the method further comprises unsubscribing from a message stream from the second local processor if the second identifier is not included in the relevance list.

5. The method of locally processing information as claimed in claim 1, further comprising subscribing to a message stream from at least one second local processor for which an identifier is included in the relevance list.

6. A method of centrally processing local information obtained by local processors in a plurality of local processors connected to a central processor, wherein the method is implemented by the central processor and comprises:
- receiving a message from a first local processor, the message including an identifier, an information matrix and a contribution vector, which relate to the first local processor;
- receiving a message from a second local processor, the message including an identifier, an information matrix and a contribution vector, which relate to the second local processor;
- adding the identifiers that relate to the first and second local processors in a list of local processors that are listened to by the central processor;
- computing a global prediction matrix from the received information matrices;
- selecting at least one local processor from the list of local processors that are listened to by the central processor, on the basis of a relevance criterion for the information matrix associated with the at least one local processor; and
- transmitting to the plurality of local processors a message including the global prediction matrix and a relevance list of the identifiers of the selected local processors.

7. The method of centrally processing local information as claimed in claim 6, wherein the selection process comprises:
- computing a value relating to the relevance of the input from the information matrix of the local processor to the global prediction matrix; and
- comparing the computed value with a threshold, the selection being made if the threshold is reached.

8. The method of centrally processing local information as claimed in claim 6, wherein multiple local processors are selected and wherein the method comprises, before the transmission process, sorting by order of decreasing relevance the identifiers of local processors selected in the relevance list.

9. The method as claimed claim 1, wherein the messages are packets of RTP type, and wherein the relevance list is included in a header of a packet of RTP type.

10. A device for locally processing information obtained by a first local processor connected to a central processor, the first local processor being identified by a first identifier and being configured to receive messages from the central processor, wherein the device for locally processing information comprises the local processor and a memory, the local processor configured to:
- obtain local measurements in order to form a local contribution vector;
- compute a first information matrix relating to the local contribution vector;
- receive a message from the central processor, comprising a relevance list of identifiers of local processors selected by the central processor on the basis of their relevance to the computation of a global prediction matrix;
- determine a presence of the first identifier in the relevance list;
- determine a contribution authorization on the basis of at least the presence of the first identifier in the relevance list; and
- transmit a message including the first identifier of the first local processor, the first information matrix and the local contribution vector at least to the central processor, on the basis of the determined contribution authorization.

11. A device for centrally processing local information obtained by local processors of a plurality of local processors connected to a central processor wherein said device comprises the central processor and a memory, the central processor configured to:
- receive a message from a local processor, the message including an identifier, an information matrix and a contribution vector, which relate to the local processor;
- add the identifier relating to the local processor to a list of local processors that are listened to by the central processor;

compute a global prediction matrix from the received information matrix;

select at least one local processor from the list of local processors that are listened to by the central processor, on the basis of a relevance criterion for the information matrix associated with the at least one local processor; and transmit to the plurality of local processors a message including the global prediction matrix and a relevance list of the identifiers of the selected local processors.

12. A system for processing local information comprising a device for centrally processing local information as claimed in claim 11 and at least one device for locally processing information wherein said device for locally processing information comprises a device for locally processing information obtained by a first local processor connected to a central processor, the first local processor being identified by a first identifier and being configured to receive messages from the central processor, wherein the device for locally processing information comprises the local processor and a memory, the local processor configured to:

obtain local measurements in order to form a local contribution vector;

compute a first information matrix relating to the local contribution vector;

receive a message from the central processor, comprising a relevance list of identifiers of local processors selected by the central processor on the basis of their relevance to the computation of a global prediction matrix;

determine a presence of the first identifier in the relevance list;

determine a contribution authorization on the basis of at least the presence of the first identifier in the relevance list; and transmit a message including the first identifier of the first local processor, the first information matrix and the local contribution vector at least to the central processor, on the basis of the determined contribution authorization.

13. A non-transitory computer readable medium having stored thereon instructions which, when executed by a processor, cause the processor to perform a method of locally processing information obtained by a first local processor connected to a central processor wherein the first local processor is identified by a first identifier and is configured to receive messages from the central processor, wherein the method is implemented by the first local processor, and wherein the method comprises:

obtaining local measurements in order to form a local contribution vector;

computing a first information matrix relating to the local contribution vector;

receiving a message from the central processor, including a relevance list of identifiers of local processors selected by the central processor on the basis of their relevance to the computation of a global prediction matrix;

on the basis of at least the presence of the first identifier in the relevance list, determining a contribution authorization; and on the basis of the determined contribution authorization, transmitting a message comprising the first identifier of the first local processor, the first information matrix and the local contribution vector, at least to the central processor.

14. A non-transitory computer readable medium having stored thereon instructions which, when executed by a processor, cause the processor to perform a method of centrally processing local information obtained by local processors in a plurality of local processors connected to a central processor, wherein the method is implemented by the central processor and comprises:

receiving a message from a first local processor, the message including an identifier, an information matrix and a contribution vector, which relate to the first local processor;

receiving a message from a second local processor, the message including an identifier, an information matrix and a contribution vector, which relate to the second local processor;

adding the identifiers that relate to the first and second local processors in a list of local processors that are listened to by the central processor;

computing a global prediction matrix from the received information matrices;

selecting at least one local processor from the list of local processors that are listened to by the central processor, on the basis of a relevance criterion for the information matrix associated with the at least one local processor; and transmitting to the plurality of local processors a message including the global prediction matrix and a relevance list of the identifiers of the selected local processors.

* * * * *